(No Model.)
G. L. McCALLUM.
BRAKE FOR RAILROAD CARS.
No. 480,338. Patented Aug. 9, 1892.
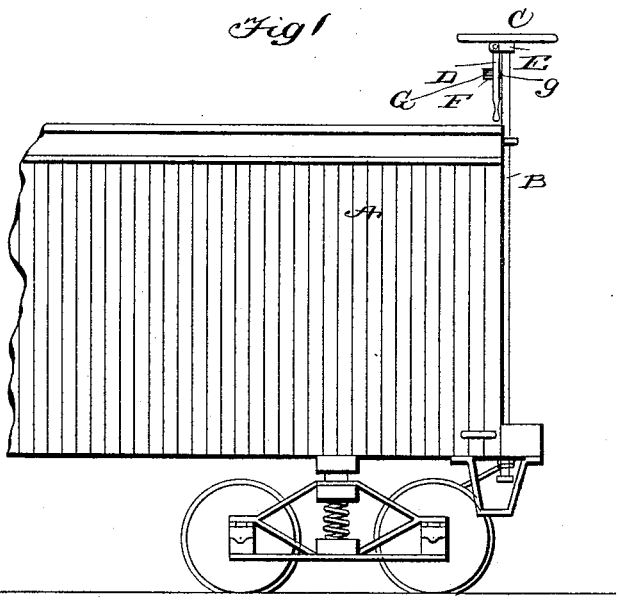
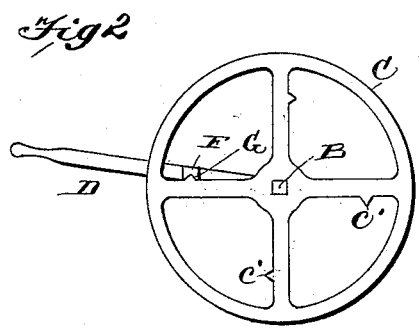
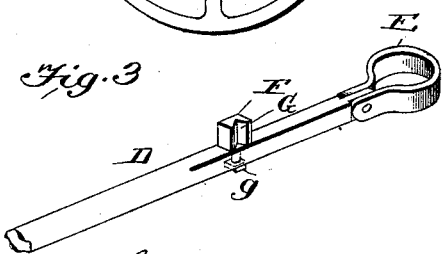

United States Patent Office.

GEORGE L. McCALLUM, OF COSTELLO, PENNSYLVANIA.

BRAKE FOR RAILROAD-CARS.

SPECIFICATION forming part of Letters Patent No. 480,338, dated August 9, 1892.

Application filed December 30, 1891. Serial No. 416,575. (No model.)

*To all whom it may concern:*

Be it known that I, GEORGE L. MCCALLUM, a citizen of the United States, residing at Costello, in the county of Potter and State of Pennsylvania, have invented certain new and useful Improvements in Brakes for Railroad-Cars; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to brakes for railroad-cars; and its objects are, first, to augment the leverage incident to the ordinary wheel and shaft by an adjustable auxiliary lever; second, to dispose said lever relatively to the wheel so as not to affect the operation of the wheel normally; third, to apply said lever readily to the wheel when a maximum effect has been obtained with the latter, and, fourth, to accomplish these ends with structural simplicity and economy. I attain these ends by the device illustrated in the accompanying drawings, in which—

Figure 1 represents a side elevation of the end of a car having my invention applied thereto. Fig. 2 is a detail view showing the correlation between the lever and the wheel, and Fig. 3 is a detail view of the auxiliary lever.

The car A has the ordinary brake-shaft B, rotated by a wheel C. The spokes of this wheel are fitted with integral or inserted notches C', and a collar E encircles the shaft just below the wheel. Pivotally suspended from said collar is the auxiliary lever D, having a slot therein for the adjustable location by nut and screw $g$ of the projection F, having a recess G, adapted to fit the notches C'. Normally this lever D hangs parallel to the shaft, and it is only designed to be used when the maximum force applied by the wheel is insufficient to check the momentum of the car, in which event the lever is raised to a horizontal position, so that the recess in the projection F will fit the notch C' in the wheel, when it will be found a much greater force can be applied to the brake.

Having thus fully described my improvements, what I claim is—

In combination with the brake-shaft of an ordinary railroad-car, wheel C, having triangular projections C', on each of the spokes thereof, a collar E, encircling said shaft just below said wheel, and the lever D, pivotally suspended in said collar, slotted longitudinally to provide a variable location for the recessed projection F by the nut $g$, whereby pressure applied upon the said lever during horizontal adjustment of the projection will supplement the pressure applied to the wheel by reason of the said projection F engaging the projection C' on the wheel, for the purpose set forth.

In testimony whereof I affix my signature in presence of two witnesses.

GEORGE L. McCALLUM.

Witnesses:
M. N. JOHNSON,
AUGUST SWANSON.